Sept. 1, 1953               R. E. VANNATTA               2,650,505
DEVICE FOR CONVERTING ONE FORM OF ROTARY MOTION
INTO ANOTHER FORM OF ROTARY MOTION
Filed Jan. 18, 1950                                                   2 Sheets-Sheet 1
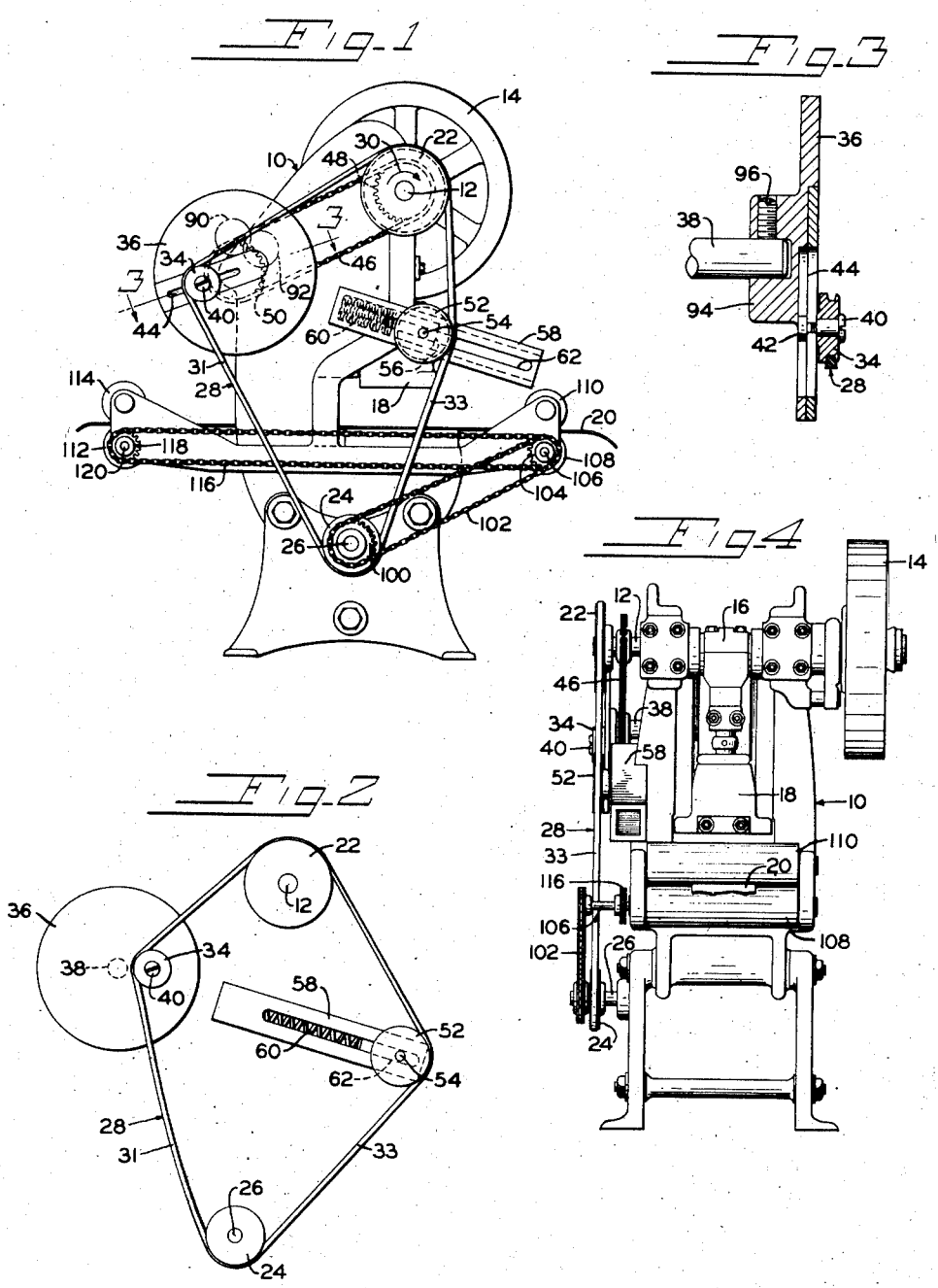
INVENTOR.
RUSSELL E. VANNATTA
BY
*Clarence B. Desjardins*
HIS ATTORNEY Sept. 1, 1953 R. E. VANNATTA 2,650,505
DEVICE FOR CONVERTING ONE FORM OF ROTARY MOTION
INTO ANOTHER FORM OF ROTARY MOTION
Filed Jan. 18, 1950 2 Sheets-Sheet 2
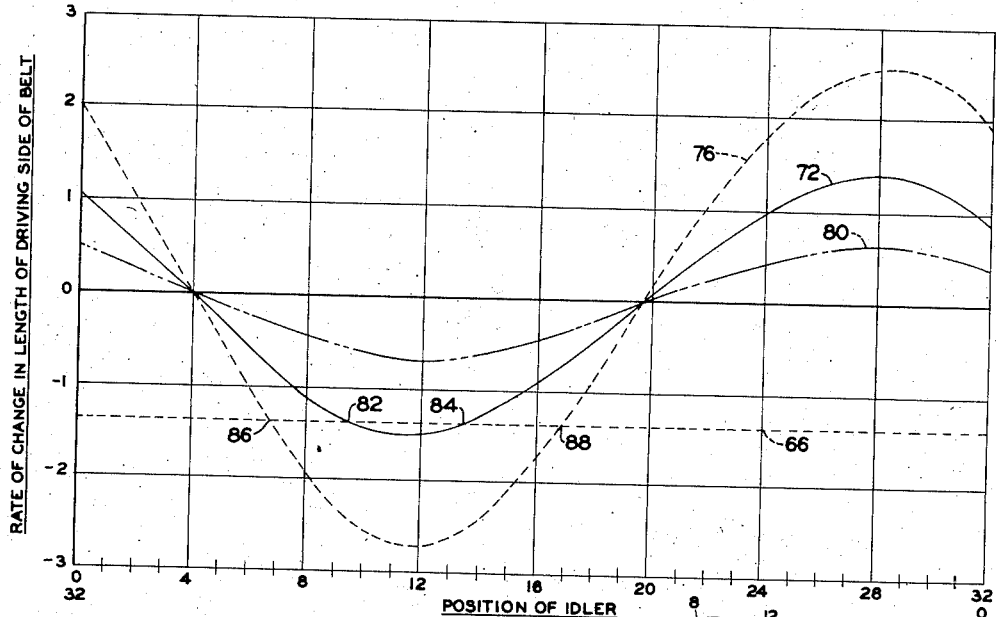
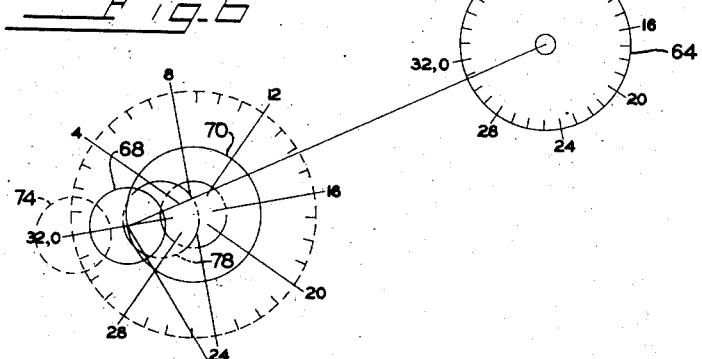
INVENTOR.
RUSSELL E. VANNATTA
BY
HIS ATTORNEY Patented Sept. 1, 1953

2,650,505

UNITED STATES PATENT OFFICE 2,650,505

DEVICE FOR CONVERTING ONE FORM OF ROTARY MOTION INTO ANOTHER FORM OF ROTARY MOTION

Russell E. Vannatta, Cincinnati, Ohio

Application January 18, 1950, Serial No. 139,240

2 Claims. (Cl. 74—217)

This invention relates to a device for converting one form of rotary motion into a different form of rotary motion or, more specifically, for converting uniform rotary motion into either intermittent rotary motion, bidirectional rotary motion, or unidirectional, fluctuating, rotary motion.

While there are many known forms of mechanism for converting one form of rotary motion into a different form of rotary motion, these mechanisms are, as a rule, lacking in flexibility, that is, they cannot readily be adjusted to vary the characteristics of the drive produced thereby and, furthermore, these mechanisms generally require complicated machining operations in the course of their manufacture with the result that they are costly to construct. Furthermore, the machined surfaces employed therein tend to wear during use and consequently cause the accuracy with which the mechanisms perform their intended functions to be impaired.

In contrast to this, my device may be quickly and easily adjusted so as to vary the characteristics of the drive produced thereby. Furthermore, the parts used in a device constructed in accordance with my invention may be simple, standard items, such as chains, sprockets, idlers, etc. Also, in my device, the change in speed of the driven element is accomplished in a smooth and uniform manner so as to prevent sudden, jerky movements which are likely to cause breakage or undue stress or strain of the mechanism to be driven by the device. For example, when a drive mechanism constructed in accordance with my invention is adjusted so as to produce intermittent rotary motion of the driven element, the latter element at the end of the rest period, will be brought smoothly into motion with gradually increasing acceleration. The driven element will likewise be brought to a stop with gradually decreasing deceleration so as to effect a smooth transition from rotary motion to a state of rest.

I am able to achieve the foregoing result by utilizing either a chain drive or a belt drive for transmitting motion from a driving element to a driven element. The driving chain or belt is made of greater than normal length, i. e., greater than the sum of twice the distance between the centers of the driven element and driving element, plus one-half the diameter of the driving sprocket or pulley, plus one-half the diameter of the driven sprocket or pulley. Hence, slack is provided whereby the length of the taut or driving side of the chain or belt may be alternately increased and decreased in a cyclical fashion whereby the ratio between the angular velocities of said elements may be caused to vary in a cyclical manner. Inasmuch as the change in length of the driving side of the chain or belt is effected in a gradual manner, the change in speed of the driven element will likewise be effected in a smooth and moderate fashion so as to prevent any sudden, or jerky, operation of the drive produced by the motion converting mechanism.

Accordingly, it is an object of the present invention to provide a simple and sturdy mechanism for converting one form of rotary motion into another form of rotary motion.

Another object of my invention is to provide a motion converting device which may be adjusted to transform uniform rotary motion into either intermittent rotary motion, reversible rotary motion, or unidirectional, fluctuating rotary motion.

Another object of the present invention is to provide a device for converting uniform rotary motion into intermittent rotary motion, said device being of such a character that the driven element will be smoothly accelerated from a state of rest to a state of rotation and then smoothly decelerated from a state of rotation to a state of rest.

Another object of the present invention is to provide a mechanism for converting one form of rotary motion into another form of rotary motion by the use of a chain or belt drive between the driving element and the driven element, which chain or belt is of greater than normal length so as to enable the length of the driving side thereof to be alternately increased and decreased in a cyclical manner whereby the angular velocity of the driven element will be caused to fluctuate with respect to the angular velocity of the driving element in a periodic or cyclic manner.

Another object of my invention is to provide a mechanism of the type set forth in the preceding object wherein means is provided for keeping the return side of the belt taut when the length of the driving side thereof is decreased.

Another object of my invention is to provide a mechanism for converting one form of rotary motion into another form of rotary motion by the use of a chain or belt drive between a driving element and a driven element, which chain or belt is of greater than normal length so as to enable the length of the driving side thereof to be alternately increased and decreased in a cyclical manner by means of an idler pulley eccentrically mounted on a rotatable member, the idler pulley being adapted to engage with the driving side of the belt and to alternately increase and decrease the length thereof as the member revolves.

Another object of my invention is to provide a mechanism of the type set forth in the preceding object wherein the position of the idler pulley on the rotatable member may be adjusted so as to enable the eccentricity of the idler pulley with respect to the axis of rotation of the member to be varied as desired.

Another object of my invention is to provide a mechanism of the type set forth in the penultimate object wherein means is provided for causing said rotatable member to rotate in synchronism with said driving element.

Another object of the present invention is to provide an intermittent feed mechanism for a punch press comprising a chain or belt drive between the crank shaft of the press and the feeding mechanism for moving the punch stock through the press, the chain or belt being of greater than normal length, with means provided for alternately increasing and decreasing the length of the driving side of the chain or belt in synchronism with the rotation of the crank shaft of the press whereby the punched stock will be given one feeding movement for each operation of the ram of the press.

Further objects of the invention will appear from the detailed description to follow, in which one form or embodiment of the invention will be set forth. This embodiment of the invention is illustrated in the accompanying drawings, forming a part of this specification, in which:

Fig. 1 is a side elevation of a punch press having an intermittent punch stock feeding mechanism constructed in accordance with the principles of my invention.

Fig. 2 is a schematic view of a part of the mechanism shown in Fig. 1 but showing the parts in a moved position.

Fig. 3 is a cross-sectional view taken along the line 3—3 in Fig. 1 showing the means whereby the intermittent motion mechanism shown in Fig. 1 may be adjusted so as to alter the character of operation thereof.

Fig. 4 is a front view of the machine shown in Fig. 1.

Fig. 5 is a graph illustrating the manner in which the rate of change in length of driving side of belt varies with the angular position of the idler.

Fig. 6 is a diagrammatic view showing the three eccentric adjustments of the idler and the various angular positions thereof which form the basis for the graph shown in Fig. 5.

Referring to the drawings, it will be observed that I have shown my invention in one possible form that it might take when applied to a punch press for the purpose of automatically feeding a strip or web of punch stock through the press. While this is one possible use to which my invention might be put, and one to which it lends itself very readily, it is to be understood, of course, that it is not limited to applications of this sort but may be used in almost every instance where it is desirable to convert uniform rotary motion into non-uniform rotary motion.

As shown in Figs. 1 and 4 of the drawings, a punch press 10 is provided with the usual crank shaft 12 on which is mounted a fly wheel 14 which also serves as a drive pulley for the press in accordance with the customary practice. As shown in Fig. 4, the crank shaft is provided at its center with the usual eccentric or crank on which is mounted a strap 16 which connects the crank with the ram 18 of the press, the ram being guided for vertical movement by suitable V-guides in the customary manner. Thus, each time the crank shaft 12 makes one revolution of movement, the ram 18 will be lowered and then raised again so as to effect one punching operation of the press. As a result, the die set up in the press will cause the desired blank to be punched out of a strip 20 which is fed from a supply roll through the press by means of conventional feed rolls which are arranged in pairs on opposite sides of the press.

One of the uses to which the present invention may be put is for providing an intermittent feeding motion of the feed rolls so as to cause the punch stock to be automatically fed through the press as the latter operates. Accordingly, the rolls must be operated in synchronism with the reciprocation of the ram 18 so as to cause the punch stock to be fed during the time when the ram is elevated and the dies are separated, and to be maintained stationary during the actual punching operation when the die on the ram contacts the die on the bed of the press.

For this purpose I have provided an intermittent drive mechanism on the left-hand side of the press which comprises a V-belt pulley 22 mounted on the left-hand end of the crank shaft 12 and a similar pulley 24 journaled on a stub shaft 26 secured to the base of the punch press. The pulleys 22 and 24 are drivingly connected by means of a V-belt 28 which is of greater than normal length, i. e., longer than that which would normally be required for connecting the pulleys 22 and 24.

As shown in Fig. 1 of the drawings, the crank shaft 12 rotates in a clock-wise direction as indicated by the arrow 30 so that the left-hand stretch 31 of the belt 28 constitutes the so-called "driving" side of the belt while the right-hand stretch 33 thereof constitutes the so-called "slack" or "return" side of the belt.

With the parts in the positions which they occupy in Fig. 1, the driving side 31 of the belt 28 is extended toward the left so as to form an angle-shaped belly therein, this being effected by means of an idler pulley or sheave 34 which is eccentrically mounted on a disc or plate 36 which is secured to a shaft 38 journaled in the frame of the punch press.

As best shown in Fig. 3 of the drawings, the idler 34 is journaled on a headed screw 40 which is threaded at its inner end so as to screw into a nut 42 by means of which it may be clamped in any desired position along the length of a radially extending slot 44 provided in the plate 36. In this manner, the degree of eccentricity of the idler 34 with respect to the shaft 38 may be adjusted within limits for a purpose to be described hereinafter.

The shaft 38 is arranged to be rotated in synchronism with the crank shaft 12 of the punch press by means of a chain 46 and sprockets 48 and 50 which are secured to the crank shaft 12 and the shaft 38, respectively. Inasmuch as the sprockets 48 and 50 are of the same diameter, the plate 36 will make one revolution for each revolution of the crank shaft 12.

As the idler 34 moves from the position shown in Fig. 1 to the position shown in Fig. 2, the belly formed in the driving side 31 of the V-belt 28 will be released and, by reason of the continued rotation of the pulley 22 on the crank shaft 12, it will be shifted to the return side 33 of the belt. The excess length of belt thus shifted from the driving side to the return side of the belt will be taken up by means of an idler pulley 52 which is journaled for rotation on a stub shaft 54 which is mounted in a block 56 slidable within a recess formed in a guide member 58 which is secured to the frame of the punch press 10. The block 56 and the idler pulley 52 carried thereby, are normally urged outwardly or to the right as viewed in Fig. 1, by means of a compression spring 60 interposed between the block and the left-hand end of the member 58. Therefore, as the belly is shifted from the driving side 31 to the return side 33 of the belt 28, the compression spring 60 will cause the pulley 52 to be moved toward the right, the shaft 54 on which the pulley is journaled moving within a slot 62 extending lengthwise of the member 58. Hence, the belly will now appear in the return side of the belt. During the next half revolution of the plate 36, the idler 34 will cause the belly to be shifted back to the driving side of the belt, the compression spring 60 yielding so as to permit the pulley 52 to move inwardly to the position shown in Fig. 1.

From the foregoing it will be realized that for each revolution of the crank shaft 12, the belly formed in the belt 28 will be shifted from the driving side of the belt to the return side thereof, and then back again to the driving side, so as to effect one complete cycle of change in the configuration of the belt between the pulleys 22 and 24. It will likewise be readily understood that during the time that the idler 34 is moving outwardly so as to increase the length of the driving side 31 of the belt, the driven pulley 24 will be rotated at increasing speed, whereas when the idler 34 is moving inwardly so as to reduce the length of the driving side 31 of the belt, the driven pulley 24 will be rotated at decreasing speed, whereby the substantially uniform rotary motion of the crank shaft 12 will be converted into periodically fluctuating rotary motion of the driven pulley 24. By suitable adjustment of the idler 34 along the slot 44 in the plate 36, the substantially uniform motion of the crank shaft 12 may be converted into either intermittent rotary motion of the driven pulley 24, unidirectional, fluctuating rotary motion of pulley 24, or reversible rotary motion thereof.

Taking first the case in which the substantially uniform rotary motion of the crank shaft 12 is converted into intermittent rotary motion of the driven pulley 24, it will be understood that if the idler 34 is moved to such a position along the slot 44 that its movement toward the plane including the axes of rotation of pulleys 22 and 24 is such as to permit the length of the driving side 31 of the belt to be reduced at a rate equal to the rate at which the belt is moved to the return side 33 by the driving pulley 22, then the driven pulley 24 will cease to rotate and will remain stationary as long as these rates remain substantially equal. However, as soon as the idler 34 begins to decrease the length of the driving side of the belt at a rate less than that at which the belt is taken up by the driving pulley, the pulley 24 will again commence to rotate and will be driven at increasing speed as the idler 34 moves from the position of Fig. 2 back toward the position of Fig. 1.

The angular velocity of the driven pulley 24, and, hence, the linear velocity of the driving surface of said pulley, and of the belt at that point, for any portion of the revolution of the driving pulley, is equal to the algebraic sum of the linear velocity of the driving pulley and the rate of change of length of the driving side of the belt, for such period, decrease in said length being considered a negative quantity and increase positive. Thus, if, for a given portion of a revolution of the driving pulley, its linear velocity is 2 inches per second and the length of the driving side of the belt is decreasing at the rate of 2 inches per second, the linear velocity of the driven pulley will be zero, as derived from the expression: $2+(-2)=0$.

In order to provide a better understanding of the manner in which the driving mechanism operates, in Fig. 5 I have shown a graph of the rate of change in the length of the driving side of the belt for each angular position of the idler 34. The zero position of the graph corresponds to the position of the idler in Fig. 1. As the plate 36 rotates clockwise, the eccentrically mounted idler moves around in a circle which, for convenience, has been divided into 32 equal parts. As shown in Fig. 6, the circle 64 which represents the pitch diameter of the driving pulley 22 is likewise divided into 32 parts. By reason of the chain drive between the crank shaft 12 and the plate 36, each time the idler moves $\frac{1}{32}$ of a revolution, the pulley 22 will also move $\frac{1}{32}$ of a revolution and a length of belt will be taken up equal to $\frac{1}{32}$ of the circumference of the circle 64. The amount of belt thus taken up by the pulley 22 as it moves from one division of the circle 64 to the next is represented in the graph in Fig. 5 by the horizontal dotted line 66. This represents the rate at which the pulley 22 takes up the belt or the linear velocity of the driving surface of the pulley. When the idler is in the position indicated by numeral 68 (Fig. 6), the center of the idler will trace the path indicated by the circle marked 70 as the plate 36 rotates, and the rate of change (positive and negative) in the length of the driving side of the belt will vary as indicated by the solid line 72 in the graph. Similarly, when the idler is in the position indicated by numeral 74 (Fig. 6), the rate of change in the length of the driving side of the belt will vary as indicated by the dotted line 76 in the graph. In a like manner, when the idler is in the position indicated by numeral 78 (Fig. 6), the rate of change in the length of the driving side of the belt will vary as shown by the dot and dash line 80 in the graph.

When the idler is in the position designated as 68 in Fig. 6, the driven pulley 24 will be given intermittent motion and will come to rest at the point indicated by numeral 82 (Fig. 5) which is the point at which the rate of decrease in the length of the driving side of the belt equals the rate at which the belt is taken up by the driving pulley. The pulley will again commence to rotate after the idler has passed the point indicated by numeral 84 where the rates are again equal. While, as shown in the graph, the curve 72 drops slightly below the line 66 between points 82 and 84 and would therefore indicate reverse rotation of the driven pulley, this has been found in practice not to occur, the pulley remaining stationary between these points on account of friction and the inertia of the parts. When the idler is in the position marked 74 in Fig. 6, the length of the driving side of the belt will be reduced faster than the driving pulley can absorb it, as the idler moves from the point marked 86 in the graph to the point marked 88, and the driven pulley will therefore rotate in a reverse direction during this interval, as will be more fully explained hereinafter. When the idler is in the position marked 78 in Fig. 6, the length of the driving side of the belt will be reduced at a rate less than that at which the belt is taken up by the driving pulley and, while the driven pulley will slow down as the idler moves in toward the center of the belt, it will not stop as in the case of intermittent motion.

Referring once more to Fig. 1, where the idler is shown in a position corresponding to the position 68 in Fig. 6, the approximate position of the idler 34 in which rotation of the driven pulley 24 will cease is shown in Fig. 1 by the dot and dash outline to which the reference numeral 90 is applied. Similarly, the approximate location of the idler 34 at the time when the driven pulley 24 will again commence to rotate is shown by the dot and dash outline to which reference numeral 92 is applied.

It will thus be seen that, during a portion of each cycle of the crank shaft of the punch press, the driven pulley 24 will be at rest and the ram 18 of the press will be able to effect a punching operation at this time. In order to enable the rest period of the pulley 24 to be coordinated with the movement of the ram 18 within close limits, means are provided for enabling the plate 36 to be rotated on the shaft 38, relative to the sprocket 50 secured to the shaft, whereby the time when the pulley 24 ceases to rotate, and the time when it again commences to rotate, may be adjusted relative to the position of the ram 18 of the punch press. As shown in Fig. 3 of the drawings, the plate 36 is provided with a hub 94 which is provided with a set screw 96, for enabling the plate to be fastened in any desired angular position on the shaft 38. Thus, by loosening the set screw 96 and rotating the plate 36 on the shaft 38, the proper timing between the rest period of the pulley 24 and the bottom of the stroke of the ram 18 may be obtained, after which the set screw may be tightened so as to maintain the proper positional relationship of the parts.

The intermittent rotation of the pulley 24 is transmitted to the feed rolls for moving the punch stock through the press, by means of a sprocket 100, which is connected with the pulley 24 for rotation therewith. The sprocket 100 is connected by a chain 102 with a sprocket 104 mounted on the end of a shaft 106, which is secured to the lower roll 108 of a pair of feed rolls 108, 110 journaled in the framework of the press. A second pair of feed rolls, 112 and 114, is provided at the rear of the press and the lower roll 112 of this pair of rolls is arranged to be driven from the roll 108 of the forward set by means of a chain 116, which connects a sprocket 118 secured to the shaft 120 of the lower roll 112 of the rear set of rolls with a similar sprocket secured to the shaft 106, heretofore mentioned. Thus, the intermittent motion of the driven pulley 24 will be transmitted to both pairs of feed rolls by means of the chain and sprocket connections just described. Accordingly, the punch stock 20 which is fed from a supply roll (not shown) through the feed rolls 112, 114 and 108, 110 will be fed between the dies set up in the press in an intermittent manner, the stock being fed forward one for each revolution of the crank shaft 12 of the press.

As previously mentioned, the intermittent drive mechanism heretofore described, may, by suitable adjustment of the idler 34, be caused to provide a forward and reverse movement of the driven pulley 24 for each revolution of the crank shaft 12. In order to secure this result, the nut 42 (Fig. 3) may be loosened and the idler slid outwardly along the slot 44 so as to provide a greater throw of the idler. Thus, a larger belly will be formed in the belt 28 than in the case of the intermittent type of operation previously described, and, also, the linear velocity of the idler when traveling from the position of Fig. 1 to the position of Fig. 2 will be increased, whereby the rate of decrease in the length of the driving side 31 of the belt will be greater than in the previous case. In other words, the belt will now be released by the idler faster than the driving pulley 22 is able to absorb it, and, hence, slack will appear in the driving side 31 of the belt. Inasmuch as the compression spring 60 is continually urging the pulley 52 toward the right, as viewed in Fig. 1, this pulley will tend to extend the return side 33 of the belt so as to take up the slack existing in the driving side 31. However, when this happens, the lower portion of the belt 28, which passes around the driven pulley 24, will be caused to move in the reverse direction around the pulley, or from the driving side 31 to the return side 33, which will result in a reversal in the direction of rotation of the pulley 24. Hence, the pulley, and the feed rolls connected thereto, will be rotated in a reverse direction until the rate at which the belt is released by the idler 34 is once more equal to the rate at which the belt is absorbed by the driving pulley, whereupon the reverse rotation of the pulley 24 will cease and it will thereafter rotate in the normal or forward direction. The extent and speed of rotation of the pulley 24, in the reverse direction, will depend upon the extent to which the idler 34 is moved outwardly along the slot 44 in the plate 36. The further the idler is moved outwardly, the greater will be the reverse rotation of the pulley, both as to extent and also as to maximum angular velocity.

Should it be desirable to cause the driven pulley 24 to merely speed up and slow down in a cyclical fashion during the substantially constant rotation of the crank shaft 12, this may be accomplished by loosening the nut 42 (Fig. 3) and moving the idler 34 from the position shown in Fig. 1 in toward the center of the plate 36. In this way, the amount of throw of the idler will be reduced beyond that which obtained in the case of intermittent rotary motion described earlier herein, and the linear velocity of the idler from its outer position as shown in Fig. 1 to its inner position as shown in Fig. 2 will be such that the rate at which the belt is released is less than the rate at which the belt is absorbed by the rotation of the driving pulley 22, whereby the driven pulley 24 will be continuously rotated though at a reduced speed during this part of the cycle. When the idler again moves in such a direction as to increase the length of the driving side of the belt, the speed of rotation of the pulley 24 will be increased although, of course, the increase in speed will not be so great as in the case where the idler is set for intermittent motion due to the smaller throw of the idler 34. Consequently, the driven pulley 24 and the feed rolls 108, 110 and 112, 114 will receive a unidirectional rotation but the speed of this rotation will be caused to fluctuate in a cyclical manner on each revolution of the crank shaft 12.

Although I have described my novel motion-converting mechanism in connection with a V-belt 28, which has been found to give entirely satisfactory results, it is to be realized, of course, that, if desired, the V-belt 28 may be replaced by a chain in which case the pulleys 22 and 24 would, of course, be replaced by sprockets adapted to mesh with the links of the chain. It is, of course, also possible to replace the chains 102 and 116 for transmitting the rotation of the driven pulley to the feed rolls with V-belts or other types of driving mechanism providing the amount of slippage involved is not considerable. In the case of the application of the device to the feed mechanism of a punch press, as shown and described herein, it is, of course, necessary that there be no slippage in the drive connecting the crank shaft 12 with the shaft 38 on which the plate 36 is mounted. It is therefore essential that some positive form of drive be employed at this point, in this particular type of application, though it is to be realized that, in those types of applications where absolute synchronism between the driving element and the driven element is not essential, a V-belt or other impositive form of drive might be successfully employed.

I am aware that the device herein described is susceptible of considerable variation without departing from the spirit of my invention and, therefore, I claim my invention broadly as indicated by the scope of the appended claims.

Having thus described my invention, what I claim as new and useful and desire to secure by United States Letters Patent, is:

1. In a device of the class described, the combination of a driving shaft; a driving pulley fast on said shaft; a stub shaft; a driven pulley loose on said last-mentioned shaft and lying in the same plane as said driving pulley; an endless belt operatively connecting said pulleys, said belt having a driving side and a return side and being of such a length as to enable a belly to be formed therein intermediate said pulleys; and a cyclically operable means for alternately increasing and decreasing the length of said belt on the driving side thereof so as to cause the speed of said driven pulley to vary in a cyclical manner, said means including an intermediate shaft lying between said driving shaft and said stub shaft and; to one side thereof so as to form a triangular arrangement of the three shafts, means operatively connecting said driving shaft with said intermediate shaft so as to cause the speed of the latter shaft to bear a predetermined ratio to the speed of said driving shaft, an idler pulley engaging with the driving side of said endless belt, and means carried by said intermediate shaft for supporting said idler pulley in the same plane as said driving and driven pulleys with the axis of said idler pulley located eccentric to the axis of said intermediate shaft, whereby the movement of the idler pulley toward and from the plane including the axes of the driving and stub shafts, as the intermediate shaft rotates, will cause the length of the driving side of the belt to be alternately increased and decreased and the speed of the driven pulley to be increased and decreased accordingly; means for automatically taking up the slack in the return side of said belt as the length of the belt on the driving side is reduced; and means for varying the amount of eccentricity of said idler pulley with respect to said intermediate shaft whereby the extent of increase and decrease in the speed of the driven pulley may be controlled.

2. In a motion converting device of the class described, the combination of a driving pulley; a driven pulley disposed in the same plane as said driving pulley; an endless belt operatively connecting said pulleys, said belt having a driving side and a return side and being of such length as to enable a belly to be formed therein intermediate said pulleys; and a cyclically operable means for alternately increasing and decreasing the length of said belt on the driving side thereof so as to cause the speed of said driven pulley to vary in a cyclical manner, said means including a rotatable member mounted for rotation about an axis parallel to the axis of rotation of said driving and driven pulleys, said member lying between and to one side of said pulleys so as to form a triangular arrangement therewith, an idler pulley supported on said member for rotation about an axis eccentric with respect to the axis of rotation of said member, said idler pulley lying in the same plane as said driving and driven pulleys and engaging with the driving side of said belt, and means for drivingly connecting said rotatable member with said driving pulley so as to cause said member to be rotated in synchronism with said driving pulley and thereby cause said idler pulley to be moved toward and away from the plane including the axes of rotation of said driving and driven pulleys to thereby cause the length of the driving side of the belt to be alternately increased and decreased and the speed of the driven pulley to be increased and decreased accordingly; means for automatically taking up the slack in the return side of said belt as the length of the driving side thereof is reduced; and means for varying the amount of eccentricity of said idler pulley with respect to the axis of rotation of said rotatable member whereby the extent of increase and decrease in the speed of the driven pulley may be controlled.

RUSSELL E. VANNATTA.

References Cited in the file of this patent

UNITED STATES PATENTS

| Number | Name | Date |
|---|---|---|
| 1,230,897 | Hawkins | June 26, 1917 |
| 1,489,167 | Spiess | Apr. 1, 1924 |
| 1,600,997 | Ross | Sept. 28, 1926 |
| 1,724,047 | Schramm | Aug. 13, 1929 |
| 2,352,797 | Miller | July 4, 1944 |

FOREIGN PATENTS

| Number | Country | Date |
|---|---|---|
| 543,087 | Great Britain | Feb. 10, 1942 |